US011984091B2

(12) United States Patent
Holland et al.

(10) Patent No.: US 11,984,091 B2
(45) Date of Patent: May 14, 2024

(54) FRAME REPLAY WITH SELECTABLE TAPS

(71) Applicant: Apple Inc., Cupertino, CA (US)

(72) Inventors: Peter F Holland, Los Gatos, CA (US); Mahesh B Chappalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/839,213

(22) Filed: Jun. 13, 2022

(65) Prior Publication Data

US 2023/0097379 A1 Mar. 30, 2023

Related U.S. Application Data

(60) Provisional application No. 63/248,147, filed on Sep. 24, 2021.

(51) Int. Cl.
*G09G 3/36* (2006.01)

(52) U.S. Cl.
CPC ..... *G09G 3/3614* (2013.01); *G09G 2320/041* (2013.01); *G09G 2320/0626* (2013.01); *G09G 2330/023* (2013.01); *G09G 2340/0435* (2013.01); *G09G 2360/12* (2013.01)

(58) Field of Classification Search
CPC .................................................... G09G 3/3614
See application file for complete search history.

(56) References Cited

U.S. PATENT DOCUMENTS

| | | | | |
|---|---|---|---|---|
| 8,253,677 | B2 | 8/2012 | Choi et al. | |
| 10,937,385 | B1 | 3/2021 | Holland et al. | |
| 2013/0257897 | A1 | 10/2013 | Kim et al. | |
| 2014/0071143 | A1 * | 3/2014 | Wang | H04N 19/85 345/98 |
| 2022/0044650 | A1 * | 2/2022 | Gao | G09G 3/3607 |

FOREIGN PATENT DOCUMENTS

| | | | |
|---|---|---|---|
| KR | 101329074 | B1 | 11/2013 |

* cited by examiner

*Primary Examiner* — Gustavo Polo
(74) *Attorney, Agent, or Firm* — Fletcher Yoder, P.C.

(57) ABSTRACT

Systems, methods, and devices are provided to selectively perform a frame replay at various stages of an image processing pipeline for an electronic display. Image processing circuitry may include first compensation circuitry that compensates for a first compensation factor relating to a first physical parameter of an electronic display and second compensation circuitry that compensates for a second compensation factor relating to a second physical parameter of the electronic display. A first tap point that enables the image frame to be stored and reused may be located between the first compensation circuitry and the second compensation circuitry, while a second tap point may be located after the second compensation circuitry.

21 Claims, 15 Drawing Sheets

FRAME REPLAY WITH SELECTABLE TAPS

CROSS-REFERENCE TO RELATED APPLICATIONS

This application claims priority to U.S. Provisional Application No. 63/248,147, filed Sep. 24, 2021, entitled "Frame Replay with Selectable Taps," the disclosure of which is incorporated by reference herein in its entirety for all purposes.

BACKGROUND

The present disclosure relates generally to replaying image data on an electronic display and, more particularly, performing frame replays using selectable taps at different stages of image processing.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—such as cellular devices, televisions, handheld devices, and notebook computers—may display images and videos on an electronic display. To improve image quality, image processing circuitry may be used to compensate for various compensation factors relating to physical parameters of an electronic display, such as panel-specific characteristics of the electronic display. Because processing the image data uses power, some electronic displays may be operated in a mode sometimes referred to as "frame replay" where image processing circuitry stores and reuses processed image frames, sending the reused processed image frames over a series of refresh periods of the electronic display. In this way, an image frame may be processed through the image processing circuitry once and then reused multiple times. When some compensation factors that were compensated for by the image processing circuitry change, however, reusing the previously processed image frame in a frame replay could result in image artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to devices and methods for power conservation and reducing image processing for an electronic display even when compensation factors relating to physical parameters of an electronic display that have been compensated for by the image processing circuitry change. Indeed, these compensation factors may include, but are not limited to, panel-specific characteristics of the electronic display, temperature of the display, display brightness, image frame duration, and/or a polarity of the electronic display. Using multiple selectable tap points at different stages of the image processing circuitry may allow for a partial frame replay when one or more, but not all, of the compensation factors change. For example, there may be one frame replay tap point at or near the output of the image processing circuitry for use when the compensation factors are expected to remain the same, and another frame replay tap point upstream of a compensation block for use when its corresponding compensation factor is expected to change. In one particular example, a frame replay tap point may be located upstream of a polarity-aware compensation block (e.g., polarity-aware dither). As used herein, the term "block" refers to circuitry that performs a particular operation or set of operations. This may allow a frame replay for a partially processed image frame even as the polarity changes, thereby reducing the amount of processing despite the changing polarity.

Multiple tap points for frame replay may increase the efficiency of the image processing circuitry by allowing for partially processed image data to be stored and reused even if some compensation factors change. Indeed, over time, even if the content of an image frame remains the same—for example, if no new image data is provided to the image processing circuitry—some compensation factors could change. To provide a few examples, the temperature of the electronic display may change; an ambient light sensor may detect a change in ambient light, causing a corresponding change in a brightness setting; the amount of time an image frame is to be displayed on the electronic display may increase or decrease; or a polarity of the programming signals used by the electronic display may switch.

Considering the particular example of polarity, liquid crystal displays (LCDs) often change the polarity of the signals (e.g., positive, negative) that are used to program different liquid crystal pixels to avoid image artifacts. For example, the LCDs may alternate programming a pixel with positive voltage signals and negative voltage signals to cancel out charge imbalances and prevent charge accumulation. Over time, charge accumulation due to polarity imbalances could result in long-term image artifacts. Switching the polarity of the programming signals is one way to prevent such charge accumulation.

While much of the compensation provided by the image processing circuitry may be unaffected by polarity, there may be certain processing blocks, such as a dither block, that at least partially compensate for the current polarity. As such, reusing a previously processed image frame that has been processed based on a particular polarity may result in image artifacts when the polarity changes. By locating a frame replay tap point downstream of many compensation blocks, but upstream of a polarity-aware compensation block (e.g., polarity-aware dither), a partially processed image frame may be reused at the point of the polarity-aware compensation block. This may avoid reprocessing the image frame through the compensation blocks upstream of that frame replay tap point. Moreover, because the upstream compensation blocks may be unused during frame replay, the upstream compensation blocks may also be power gated or have a reduced clock frequency to save additional power.

Other frame replay tap points may be located at different stages in the image processing circuitry. For example, a first frame replay tap point may be located before a first set of compensation blocks that compensate for a first compensation factor (e.g., one or more of temperature, brightness, frame duration, or polarity), a second frame replay tap point may be located after the first set of compensation blocks but before a second set of compensation blocks that compensate for a second compensation factor (e.g., a different one or more of temperature, brightness, frame duration, or polarity), and so forth.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
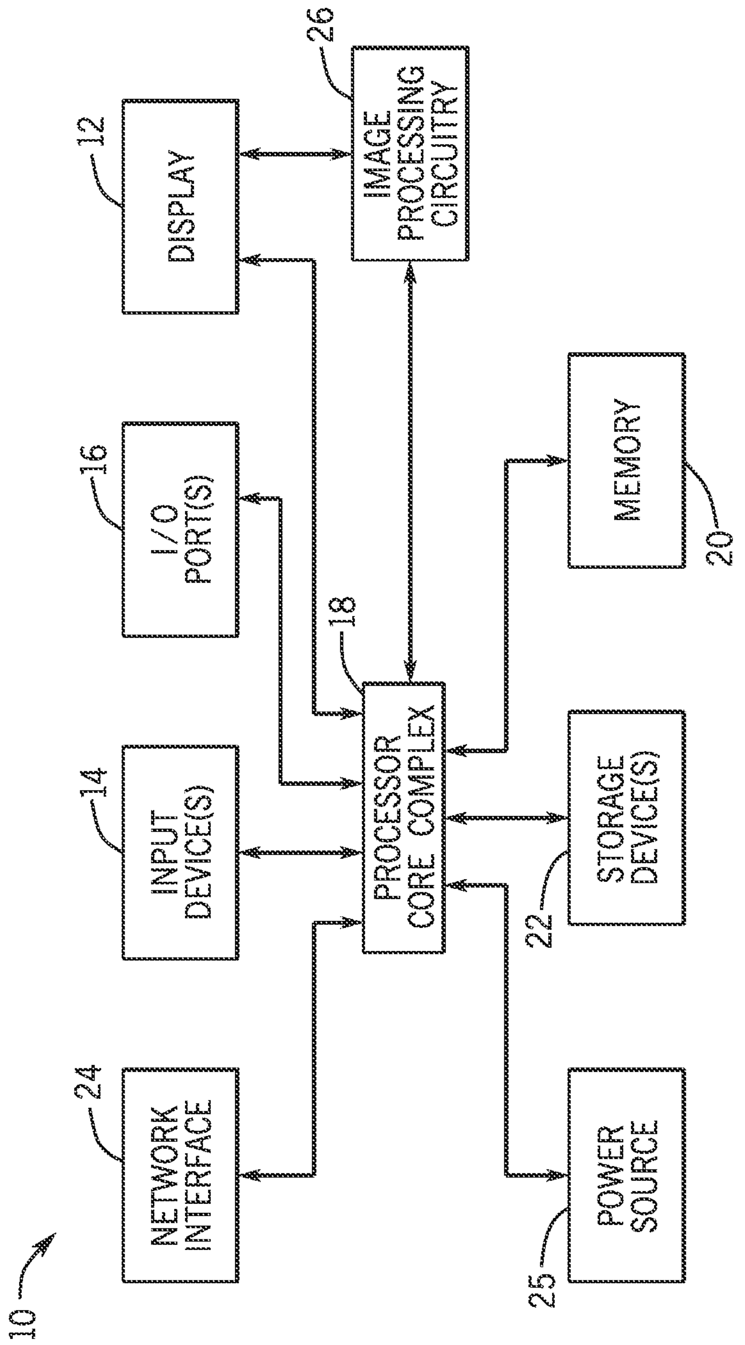
FIG. 1 is a block diagram of an electronic device used to display image frames, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As mentioned above, numerous electronic devices—such as cellular devices, televisions, handheld devices, and notebook computers—may display images and videos on an electronic display. For example, electronic devices may include an application processor that renders image frames by generating corresponding image data, which may be stored in memory. To improve image quality when the image data is displayed, image processing circuitry may be used to compensate for various compensation factors relating to physical parameters of the electronic display that could impact the appearance of the image data. These compensation factors may include, but are not limited to, panel-specific characteristics of the electronic display, temperature of the display, display brightness, image frame duration, and/or a polarity of the electronic display.

To save power, the electronic display may be on while part of the electronic device is operated in a lower-power mode (e.g., power gated, turned off, unused to reduce dynamic power consumption, operate with a reduced frequency). For example, the electronic display may be operated as an always-on display that continuously displays images while the electronic device is not in operation or powered-off except for certain parts of the image processing circuitry. The electronic display may be functionally separate from image processing circuitry of the electronic device (e.g., a display pipeline).

To avoid repeatedly processing the same image frame when the content remains the same and compensation factors remain substantially the same, an image frame may be processed through the image processing circuitry once and then reused multiple times. This is sometimes referred to as a "frame replay" mode. During a frame replay, image data that has already been processed is stored for future use. Thereafter, the image processing circuitry may further process and send the reused processed image frames over a series of refresh periods of the electronic display. When compensation factors that were compensated for by the image processing circuitry change, however, reusing the previously processed image frame in a frame replay could result in image artifacts.

By using multiple selectable tap points at different stages of the image processing circuitry, a partially processed image frame may be reused when certain compensation factors change. For example, there may be one frame replay tap point at or near the output of the image processing circuitry for use when the compensation factors are expected to remain the same, and another frame replay tap point upstream of a compensation block for use when its corresponding compensation factor is expected to change. In one particular example, a frame replay tap point may be located upstream of a polarity-aware compensation block (e.g., polarity-aware dither). This may allow a frame replay for a partially processed image frame even as the polarity changes, thereby reducing the amount of processing despite the changing polarity.

Considering the particular example of polarity, liquid crystal displays (LCDs) often change the polarity of the signals (e.g., positive, negative) that are used to program different liquid crystal pixels to avoid image artifacts. For example, the LCDs may alternate programming a pixel with positive voltage signals and negative voltage signals to cancel out charge imbalances and prevent charge accumulation. Over time, charge accumulation due to polarity imbalances could result in long-term image artifacts. Switching the polarity of the programming signals is one way to prevent such charge accumulation.

While much of the compensation provided by the image processing circuitry may be unaffected by polarity, there may be certain processing blocks, such as a dither block, that at least partially compensate for the current polarity. As such, reusing a previously processed image frame that has been processed based on a particular polarity may result in image artifacts when the polarity changes. By locating a frame replay tap point downstream of many compensation blocks, but upstream of a polarity-aware compensation block (e.g., polarity-aware dither), a partially processed image frame may be reused at the point of the polarity-aware compensation block. This may avoid reprocessing the image frame through the compensation blocks upstream of that frame replay tap point. Moreover, because the upstream compensation blocks may be unused during frame replay, the upstream compensation blocks may also be power gated or may operate with a reduced clock frequency to save additional power.

Other frame replay tap points may be located at different stages in the image processing circuitry. For example, a first frame replay tap point may be located before a first set of compensation blocks that compensate for a first compensation factor (e.g., one or more of temperature, brightness, frame duration, or polarity), a second frame replay tap point may be located after the first set of compensation blocks but before a second set of compensation blocks that compensate for a second compensation factor (e.g., a different one or more of temperature, brightness, frame duration, or polarity), and so forth.

These features may be used by an electronic device 10 including an electronic display 12, as shown in FIG. 1. The electronic device 10 may be any suitable electronic device, such as a computer, a mobile phone, a portable media device, a tablet, a television, a virtual-reality headset, a vehicle dashboard, or the like. Thus, it should be noted that FIG. 1 is merely one example of a particular implementation and is intended to illustrate the types of components that may be present in an electronic device 10.

In the depicted embodiment, the electronic device 10 includes the display 12, one or more input devices 14, one or more input/output (I/O) port(s) 16, a processor core complex 18 having one or more processor(s) or processor cores, local memory 20, one or more memory storage device(s) 22, a network interface 24, a power source 25 (e.g., power supply), and image processing circuitry 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the memory storage device 22 may be included in a single component. Additionally or alternatively, the image processing circuitry 26 (e.g., a graphics processing unit, display pipe) may be included in the processor core complex 18.

The processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

The local memory 20 and/or the main memory storage device 22 may include one or more tangible, non-transitory, computer-readable media. For example, the local memory 20 may include random access memory (RAM) and the main memory storage device 22 may include read only memory (ROM), rewritable non-volatile memory such as flash memory, hard drives, optical discs, and/or the like.

The network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network.

The power source 25 may provide electrical power to one or more components in the electronic device 10, such as the processor core complex 18 and/or the electronic display 12. The power source 25 may include any suitable source of energy, such as a rechargeable lithium polymer (Li-poly) battery and/or an alternating current (AC) power converter. The I/O ports 16 may enable the electronic device 10 to interface with other electronic devices.

The input devices 14 may represent any suitable structures that facilitate user interaction with the electronic device 10. The input devices 14 may include a button, a keyboard, a mouse, a trackpad, or the like. Additionally, in some embodiments, the input devices 14 may include touch-sensing components in the electronic display 12. In such embodiments, the touch sensing components may receive user inputs by detecting the occurrence and/or position of an object touching the surface of the electronic display 12.

The electronic display 12 may include a display panel with one or more display pixels. The electronic display 12 may control light emission from the display pixels to present visual representations of information, such as a graphical user interface (GUI) of an operating system, an application interface, a still image, or video content, by displaying frames based at least in part on corresponding image data. As depicted, the electronic display 12 is operably coupled to the processor core complex 18 and the image processing circuitry 26. In this manner, the electronic display 12 may display frames based at least in part on image data generated by the processor core complex 18 and processed by the image processing circuitry 26, which may be separate from or an integrated component of the processor core complex 18. Additionally or alternatively, the electronic display 12 may display frames based at least in part on image data received via the network interface 24, an input device, local memory 20, the main memory storage device 22, and/or an I/O port 16.

Figure 2:
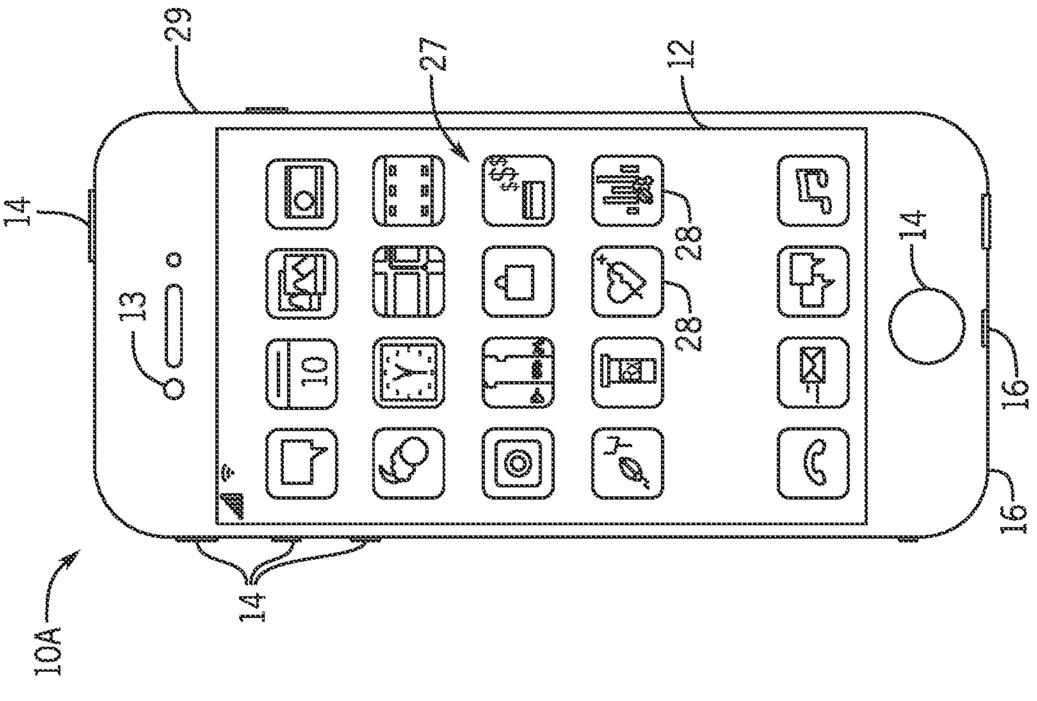
FIG. 2 is an example of the electronic device of FIG. 1, in accordance with an embodiment.

The electronic device 10 may take a variety of forms. In one example, the electronic device 10 is a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 29 (e.g., housing). In some embodiments, the enclosure 29 may protect interior components from physical damage and/or shield them from electromagnetic interference. Additionally, as depicted, the enclosure 29 may surround the electronic display 12. In the depicted embodiment, the electronic display 12 is displaying a graphical user interface (GUI) 27 having an array of icons 28. By way of example, when an icon 28 is selected either by an input device 14 or a touch-sensing component of the electronic display 12, an application program may launch.

Furthermore, as depicted, input devices 14 may be accessed through openings in the enclosure 29. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 may be accessed through openings in the enclosure 29. In some embodiments, the I/O ports 16 may include, for example, an audio jack to connect to external devices.

Figure 3:
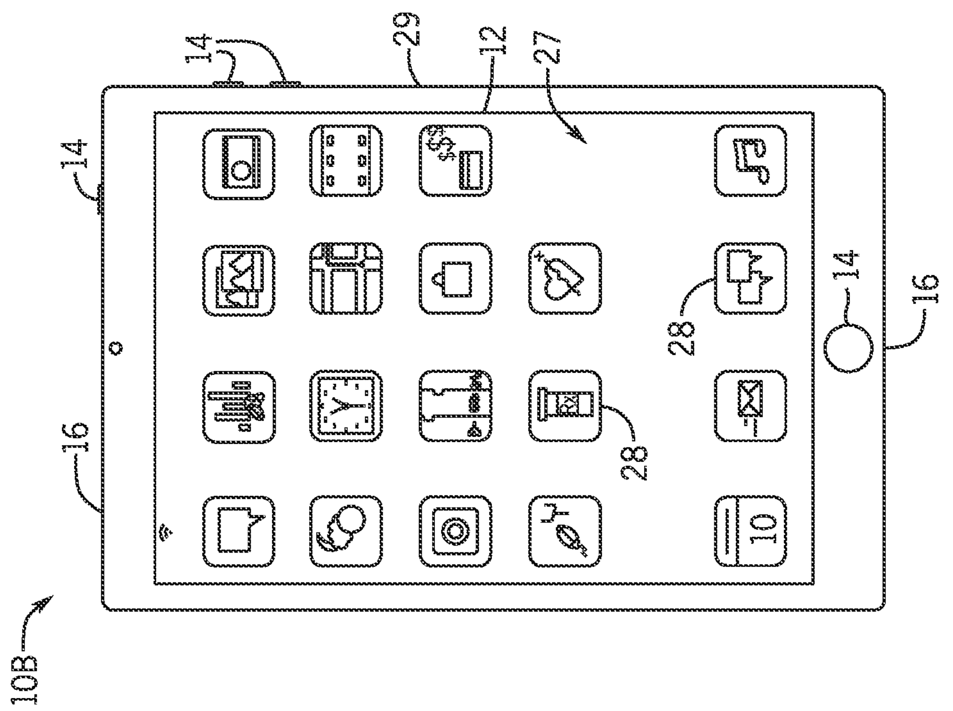
FIG. 3 is an example of the electronic device of FIG. 1, in accordance with an embodiment.
Figure 4:
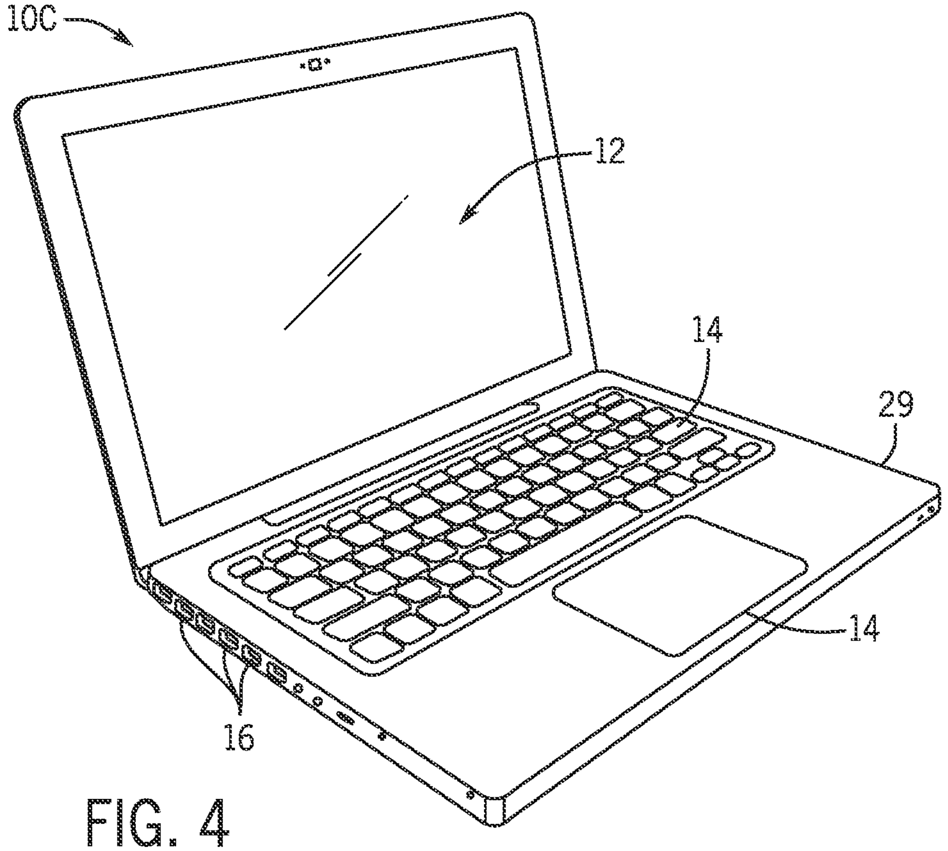
FIG. 4 is an example of the electronic device of FIG. 1, in accordance with an embodiment.
Figure 5:
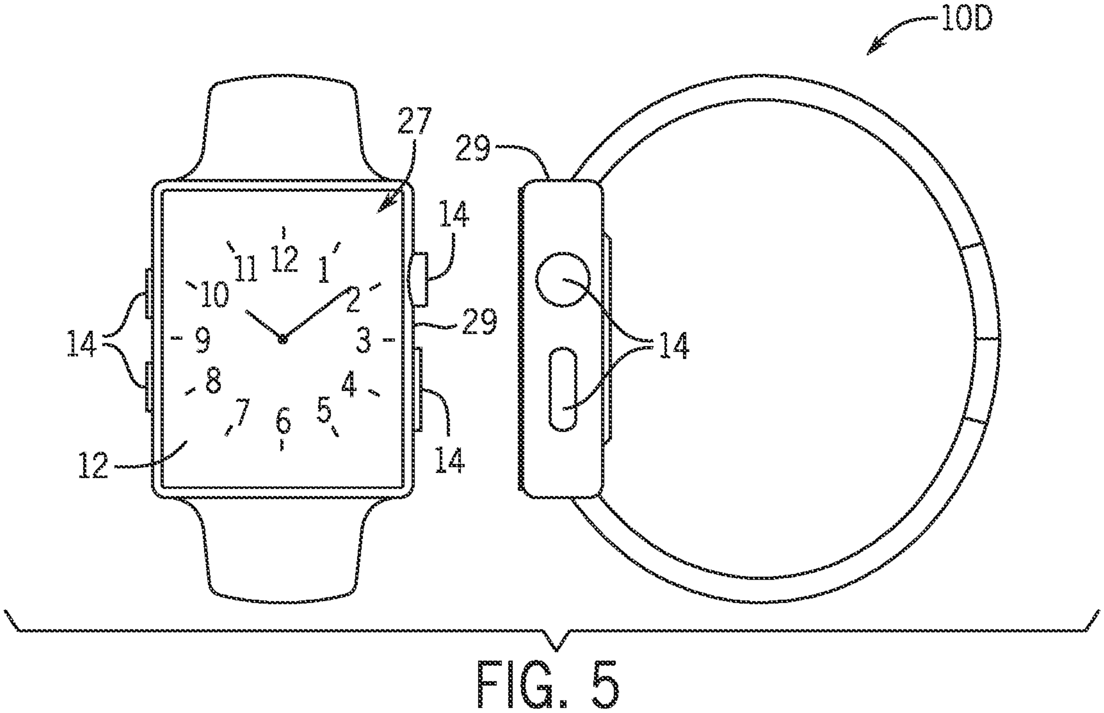
FIG. 5 is an example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 29.

In any case, as described above, operating an electronic device 10 to communicate information by displaying images on its electronic display 12 generally consumes electrical power. Additionally, as described above, electronic devices 10 often store a finite amount of electrical energy. Thus, to improve power efficiency, an electronic device 10 may operate an electronic display 12 as an always-on display while temporarily power-gating and/or powering-off certain components. These may include image processing circuitry (e.g., a display pipeline) that processes image data before the image data is used to display a corresponding image on the electronic display 12.

Figure 6:
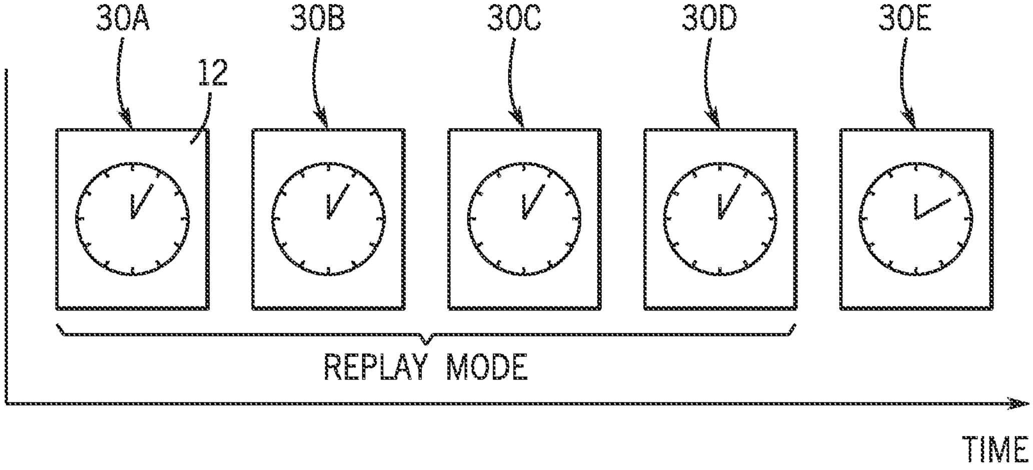
FIG. 6 is an illustration of a display of the electronic device of FIG. 1 presenting an image using a replay mode, in accordance with an embodiment.

Certain image processing circuitry may be operated in a lower-power mode e.g., power gated, turned off, unused to reduce dynamic power consumption, operate with a reduced frequency) during a frame replay where the same image frame is to be displayed on an electronic display for some period of time. In one example, shown in FIG. 6, the content on the electronic display stays the same for several image frames 30A before changing to content at an image frame 30B. While the image frames 30A are repeated, a portion of the electronic device 10 may be operated in a frame replay mode.

In a frame replay mode, an image frame may be processed through the image processing circuitry once and then reused multiple times. During a frame replay, image data that has already been processed is stored for future use. While in the frame replay mode, the electronic device 10 may not repeat the complete processing of the image frame, but may instead retrieve already fully or partially processed image data from memory 20 and/or memory storage devices 22. Furthermore, while in the frame replay mode, portions of the electronic device 10 not used in retrieval of the already fully or partially processed image frame may be operated in a lower-power mode (e.g., power gated, turned off, unused to reduce dynamic power consumption, operate with a reduced frequency) to reduce power consumption of the electronic device 10. For example, a portion responsible for processing of image data (e.g., such as processing to generate processed image data) of the image processing circuitry may be power-gated during the replay mode. This may be permitted because the portion of the image processing circuitry that is power gated may have already processed the image frame.

The electronic device 10 may remain in the replay mode until an exit condition is met and/or detected by the processor core complex 18 and/or image processing circuitry. An example of an exit condition may be receiving a notification of a new image frame, detection of new image data (e.g., changing image, different image data) being transmitted to the image processing circuitry 26, or an indication of a change in a certain compensation factor (e.g., change in temperature, brightness, frame duration, polarity). Upon exit from the replay mode, the image processing circuitry may no longer be power gated and may fully process a new image frame for display (e.g., as represented by image frame 30B).

Figure 7:
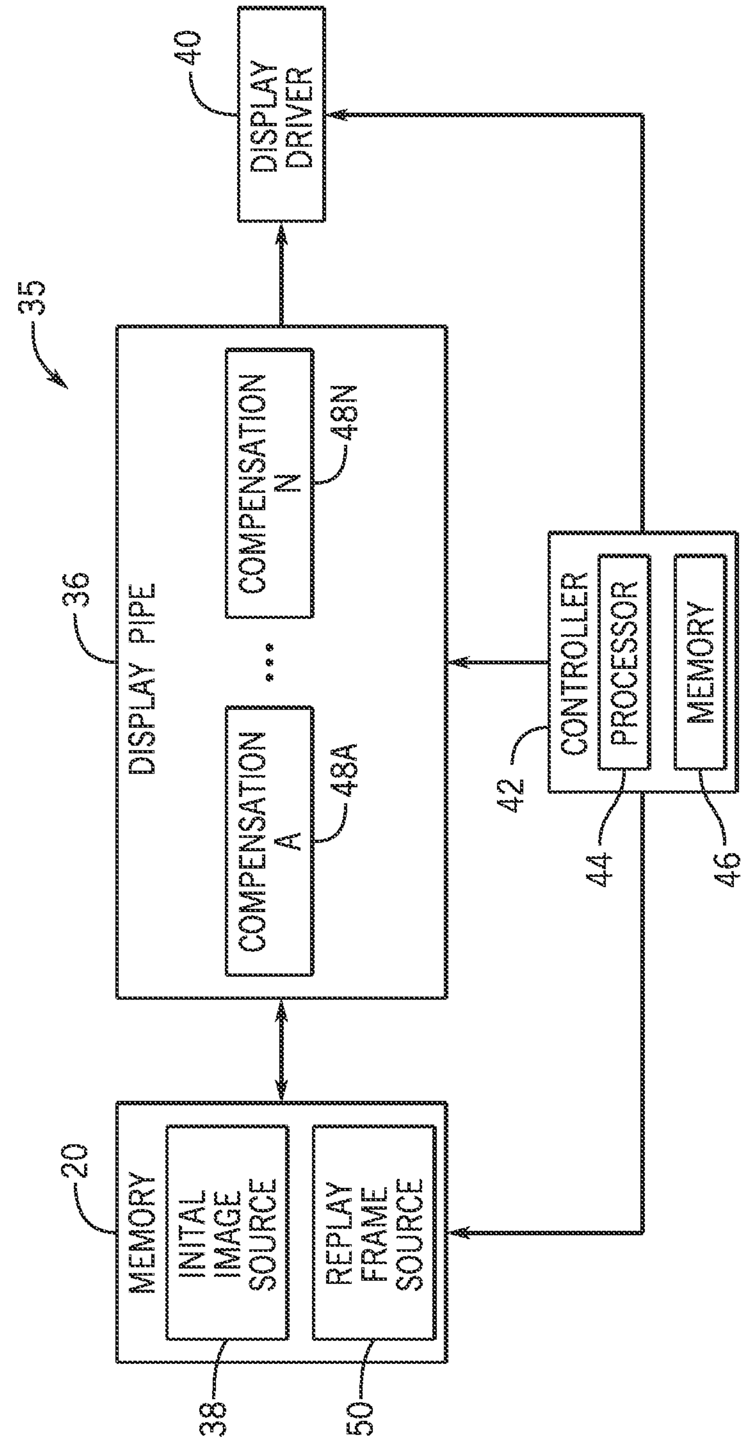
FIG. 7 is a block diagram of image processing circuitry in the form of a display pipeline, in accordance with an embodiment.

FIG. 7 illustrates a block diagram of a portion 35 of the electronic device 10 including image processing circuitry, here shown to include a display pipe 36 (sometimes referred to as a "display pipeline"). The display pipe 36 may be implemented by any suitable circuitry in the electronic device 10. For example, the display pipe 36 may be included in the processor core complex 18, the image processing circuitry 26, or both.

As depicted, the portion 35 of the electronic device 10 also includes access to the memory 20, which may include an initial image source 38, a display driver 40, and a controller 42. The controller 42 may control operation of the display pipe 36, including access to the memory 20, and/or the display driver 40. The controller 42 may include a controller processor 44 and controller memory 46 to control the display pipe 36. The controller processor 44 may execute instructions stored in the controller memory 46. The controller processor 44 may be included in the processor core complex 18, the image processing circuitry 26, a timing controller in the display 12, a separate processing module, or any combination thereof. The electronic device 10 may include the controller memory 46, at least in part, in the local memory 20, the memory storage devices 22, a separate tangible, non-transitory, computer readable medium, or any combination thereof.

The display pipe 36 may receive new image frames via an initial image source 38. The initial image source 38 may include one or source image buffers. The initial image source 38 may receive the data in the one or more source image buffers and transmit the received data to the display pipe 36 for preparation of an image frame for presentation on the display 12 via display driver 40. It should be noted that other arrangements of the initial image source 38 may be suitable and may use systems and methods described herein. For example, the initial image source 38 may couple to the display pipe 36 through the memory 20 and the display pipe 36 may include a fetch block to interface with the memory 20.

The display pipe 36 may process image data for an image frame stored in the memory 20 to reduce or eliminate image artifacts caused by certain factors corresponding to the electronic display. The display pipe 36 may sequentially apply compensation for different compensation factors via any suitable number of compensation blocks 48, here shown as compensation blocks 48A to 48N. These may include one or more blocks to perform manipulation (e.g., processing, compositing) of the image data, conversion of the data from source data to display data, a color manager block that may include a color lookup table (CLUT), a pixel contrast control (PCC) block, a sub-pixel layout resampler (SPLR) block, a gain block, an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a sub-pixel uniformity compensation (SPUC) block, a content dependent frame duration (CDFD) block, an ambient light sensing (ALS) block, or a polarity-aware dithering block, to name a few examples. Compensation blocks 48 such as those mentioned above may compensate for a number of compensation factors, some of which may include brightness, temperature, frame duration, or polarity.

The controller 42 may determine whether an image being displayed on the display 12 is changing. When the controller 42 determines that an image being displayed on the display 12 is changing, the image frame that is processed may not be saved for use in a replay mode. However, if the controller 42 determines successive image frames are unchanged (e.g., the same image frame remains stored in the initial image source 38, new image data is not received from an application processor of the processor core complex 18), the display pipe 36 may operate in a frame replay mode. By contrast, when the controller 42 determines that generated images are changing (e.g., different image frames are being retrieved from the initial image source 38, new image data is being received from an application processor of the processor core complex 18), the display pipe may operate in a non-replay mode. In either case, after processing, the display pipe 36 may output processed image data of an image frame to the display driver 40. The display driver 40 may cause the image frame to be displayed on the electronic display.

When the controller 42 determines to operate the display pipe 36 in a frame replay mode (e.g., new image data is not received, a threshold number of successive identical image frames have been received), a fully or partially processed image frame may be stored into a replay frame source 50 of the memory 20. The fully or partially processed image frame may be retrieved and output or further processed, albeit while some compensation blocks 48 are operated in a lower-power mode (e.g., power gated, turned off, unused to reduce dynamic power consumption, operate with a reduced frequency). This may save power and processing bandwidth.

Figure 8:
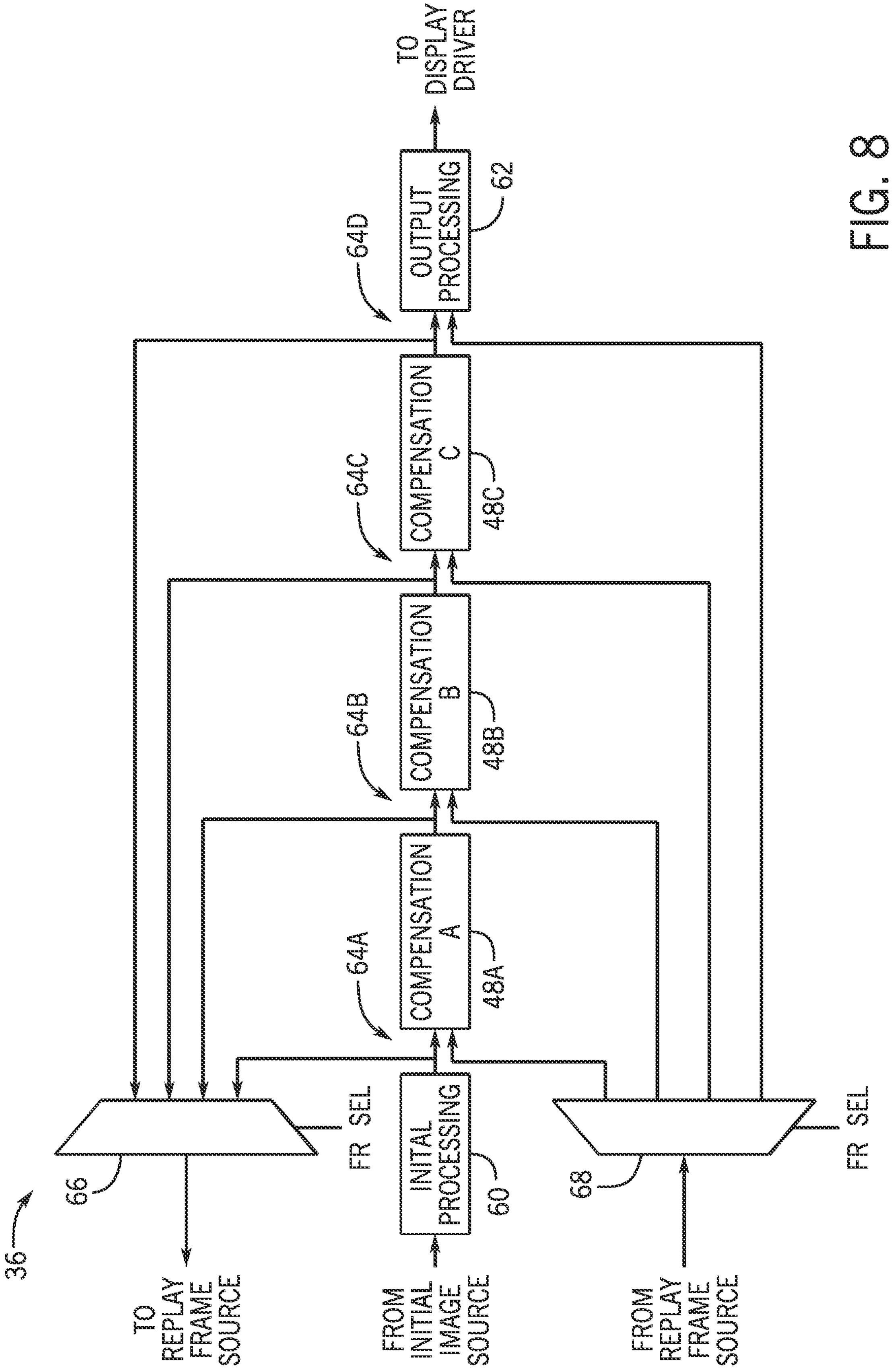
FIG. 8 is a block diagram of an example of the display pipeline of FIG. 7 having multiple selectable frame replay tap points, in accordance with an embodiment.

FIG. 8 provides one example of components that may appear in the display pipe 36. Initial processing circuitry 60 may receive an image frame from the initial image source. The initial processing circuitry 60 may process the image data of the image frame to place it in better condition for further processing (e.g., format conversion, horizontal and/or vertical scaling, some color management). The compensation blocks 48 may include individual or sets of processing blocks that may account for certain compensation factors. In the example of FIG. 8, there are three sets of compensation blocks 48A, 48B, and 48C. The compensation blocks 48A, 48B, and 48C may represent any suitable image processing to compensate for any aspects of display on the electronic display (e.g., a color manager block that may include a color lookup table (CLUT), a pixel contrast control (PCC) block, a sub-pixel layout resampler (SPLR) block, a gain block, an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a sub-pixel uniformity compensation (SPUC) block, a content dependent frame duration (CDFD) block, an ambient light sensing (ALS) block, or a polarity-aware dithering block). The compensation blocks 48 may compensate for any suitable permanent or temporary characteristics of the display (e.g., panel calibration characteristics, pixel electrical-luminance response characteristics, display shape characteristics, temperature, display brightness, frame duration, polarity). In some cases, a single processing block may compensate for several compensation factors. By way of example, a white point correction (WPC) block may compensate for temperature and display brightness. An output processing block 62 may perform certain output operations such as repacking and/or swizzling, cropping, and/or splitting the image frame before it is sent to the display driver.

The display pipe 36 may have any suitable number of replay tap points 64. In the example of FIG. 8, a first frame replay tap point 64A is located after the initial processing block 60 but before the first compensation block 48A, a second frame replay tap point 64B is located between the first compensation block 48A and the second compensation block 48B, a third frame replay tap point 64C is located between the second compensation block 48B and the third compensation block 48C, and a fourth frame replay tap point 64D is located after the third compensation block 48A and before the output processing block 62.

When the display pipe 36 is operating in the frame replay mode, selection circuitry 66 (e.g., a multiplexer, a crossbar) may select a particular frame replay tap point 64A, 64B, 64C, or 64D from which to receive a partially processed image frame based on a selection signal (FR Sel). Selection circuitry 68 may select the compensation block 48A, 48B, 48C, or output processing block 62 corresponding to the selected frame replay tap point 64A, 64B, 64C, or 64D based on the selection signal (FR Sel). Although the example of FIG. 8 illustrates selecting one fully or partially processed image frame from one frame replay tap point 64 to save the amount of image data that is taken up, in some embodiments, multiple fully or partially processed image frames may be stored and selected from memory later. When storing or retrieving a fully or partially processed image frame for frame replay mode, any suitable compression and decompression may be applied (e.g., lossless, entropy-encoded compression and decompression). Doing so may reduce the total amount of space taken up in memory by the fully or partially processed image frame.

Figure 9:
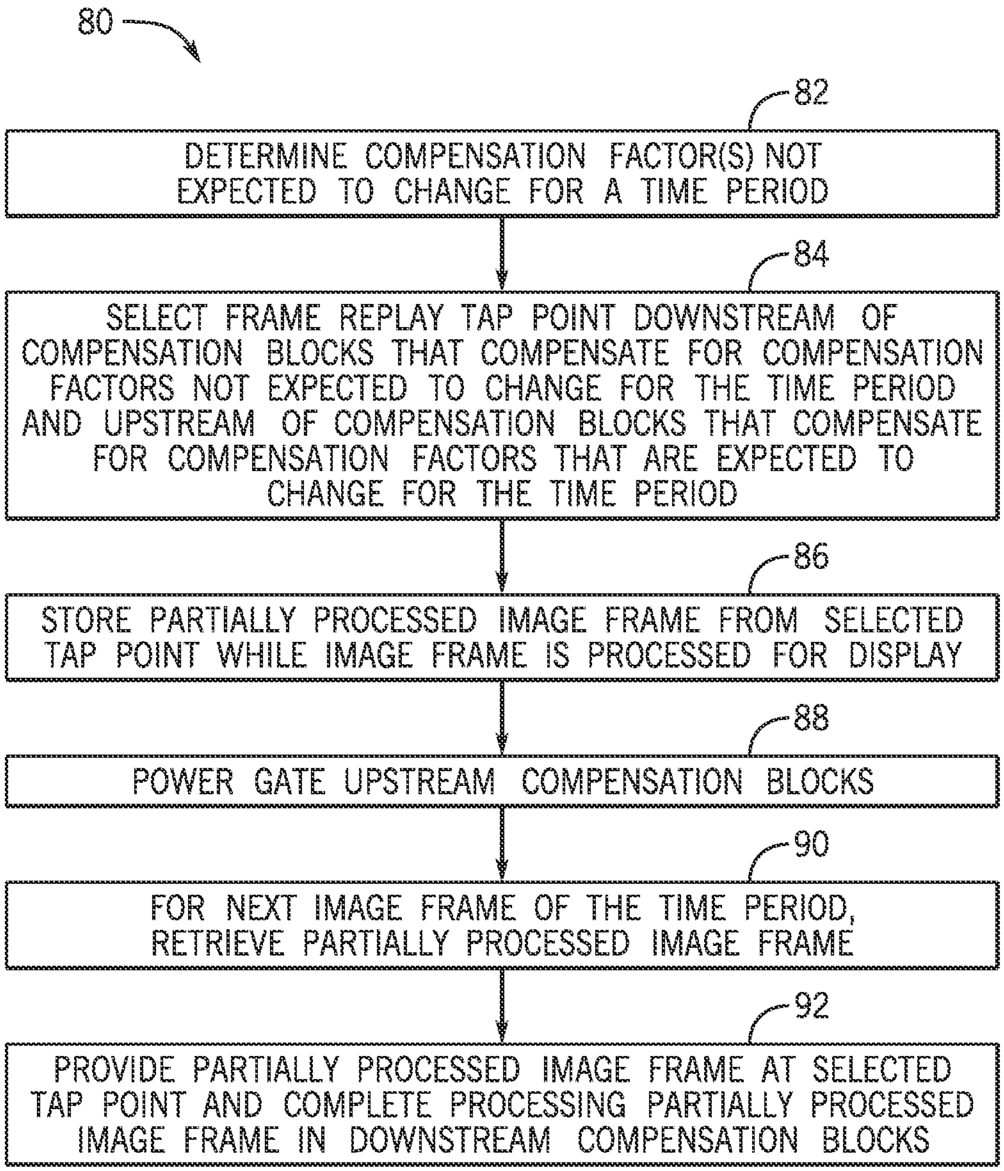
FIG. 9 is a flowchart of a method for performing a frame replay operation using the multiple selectable frame replay tap points, in accordance with an embodiment.

As described by a flowchart 80 of FIG. 9, a particular replay tap point may be selected based on which compensation factor(s) are expected not to change for some period of time. At the start of the flowchart 80, the controller 42 may determine whether any compensation factor(s) are expected not to change for some period of time (block 82). The period of time that is considered may be selected based on the extent to which power savings may be gained by frame replay for avoiding image processing based on a particular compensation factor. Compensation factors that may be determined not to be expected to change for some period of time may include temperature, display brightness, frame duration, or polarity, to name a few examples.

Different compensation factors may be compensated for by different compensation blocks 48. As such, the controller 42 may select a frame replay tap point 64 downstream of compensation blocks 48 that compensate for compensation factors not expected to change for the time period and upstream of compensation blocks 48 that compensate for compensation factors that are expected to change for the time period (block 84).

After processing the image frame through the initial processing block 60 and/or compensation block(s) 48 upstream of the selected display replay tap point 64, the partially processed image frame may be stored into the replay frame source 50 in the memory 20 (block 86). The compensation block(s) 48 upstream of the selected display replay tap point 64 may be operated in a lower-power mode (e.g., power gated, turned off, unused to reduce dynamic power consumption, operate with a reduced frequency) (block 88). In this way, the compensation block(s) 48 upstream of the selected display replay tap point 64 may operate in a low-power mode (e.g., consuming less power, be turned off) and may no longer process the image frame. Therefore, to replay the next image frame, the partially processed image frame may be retrieved from the replay frame store (block 90) and processed by the blocks downstream of the selected display replay tap point 64 (block 92). The partially processed image frame may continue to be retrieved and processed by the blocks of the display pipe 36 downstream of the selected frame replay tap point 64 until new content is received in a new image frame or the controller 42 detects that compensation factor has changed.

The controller 42 may detect that the compensation factor has changed due in a variety of ways. For example, the controller 42 may receive an indication from another component of the electronic device 10 (e.g., an indication of temperature change from temperature sensor, an indication of ambient light change that would involve changing display brightness from an ambient light sensor, a message indicating a change in a global display brightness value (DBV) from an operating system, a message from the electronic display indicating a change in conditions). The controller 42 may, additionally or alternatively, detect that the compensation factor has changed by executing a process in which the compensation factor is known or predicted to change after the period of time (e.g., defining that the polarity is to change at a certain time, defining a change in frame duration through a frame duration walk-down).

Figure 10:
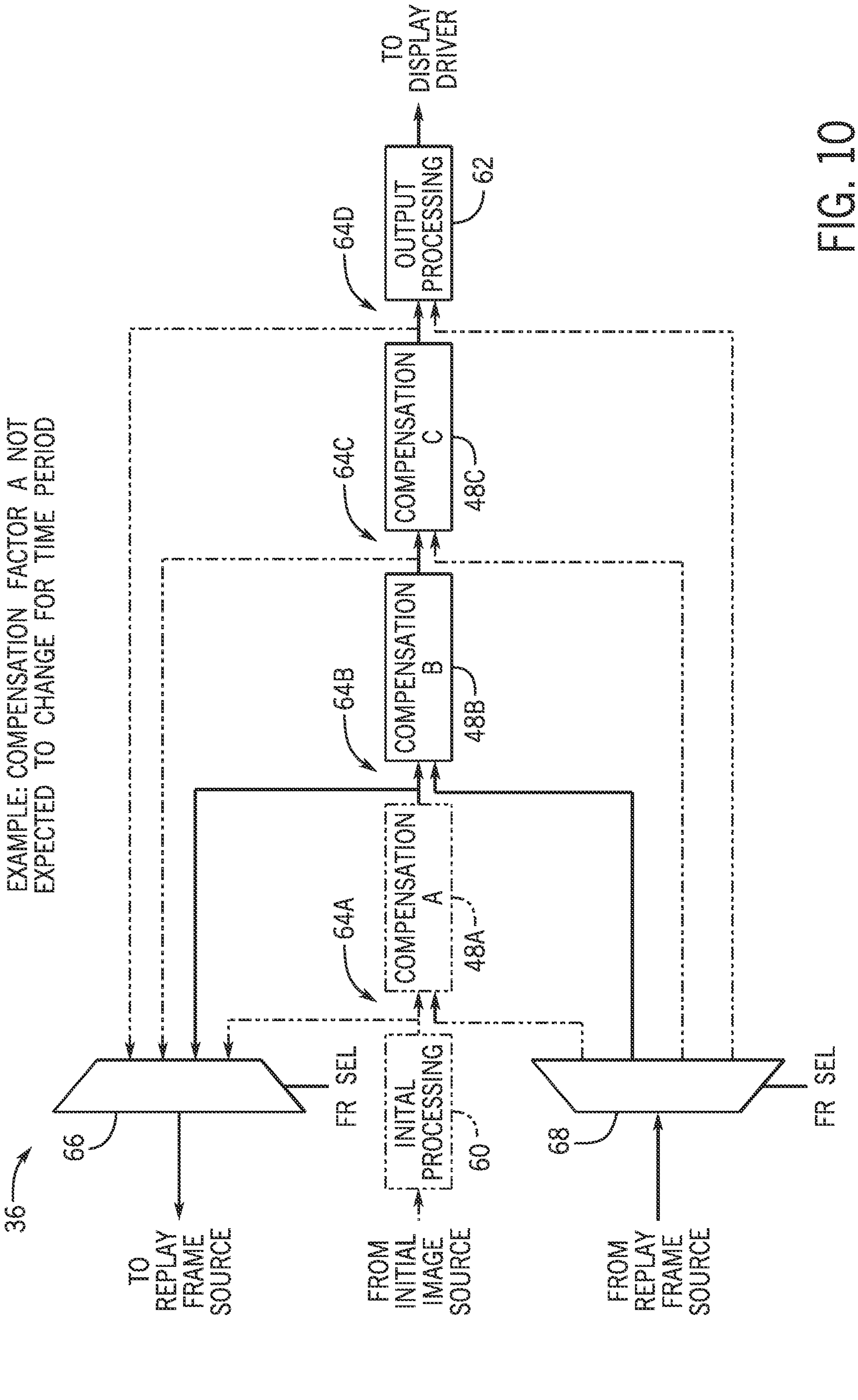
FIG. 10 is an example of a frame replay operation using a frame replay tap point located after a compensation block for a first compensation factor, in accordance with an embodiment.
Figure 11:
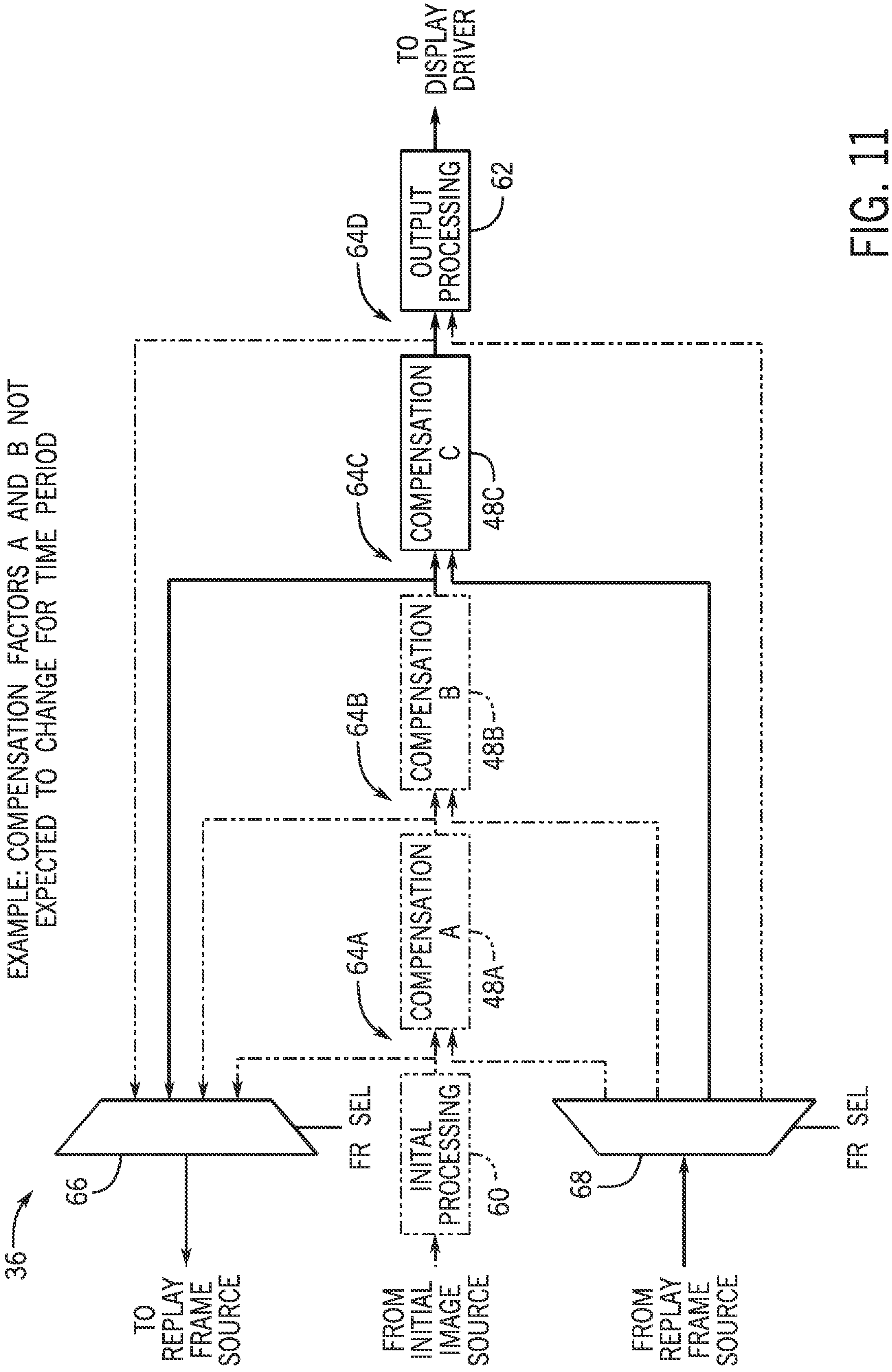
FIG. 11 is an example of a frame replay operation using a frame replay tap point located after a compensation block for the first compensation factor and a compensation block for a second compensation factor, in accordance with an embodiment.

FIGS. 10 and 11 represent two examples of performing the method of the flowchart 80 of FIG. 9 using the display pipe 36. In FIG. 10, compensation factor A is not expected to change for a time period sufficient to justify entering a frame replay mode (e.g., the amount of power saved by entering the frame replay mode for the time period would be greater than the power cost by storing the partially processed image frame). The frame replay tap point 64B, located downstream of the compensation block 48A, may be selected. Thus, a partially processed image frame may be collected after processing through the initial processing block 60 and the compensation block 48A at the frame replay tap point 64B. Afterward, the initial processing block 60 and the compensation block 48A may be operated in a lower-power mode (e.g., power gated, turned off, unused to reduce dynamic power consumption, operate with a reduced frequency). The partially processed image frame may be retrieved and processed by the blocks of the display pipe 36 downstream of the selected tap until new content is received in a new image frame or the controller 42 detects that compensation factor A has changed.

In FIG. 11, compensation factors A and B are not expected to change for a time period sufficient to justify entering a frame replay mode (e.g., the amount of power saved by entering the frame replay mode for the time period would be greater than the power cost by storing the partially processed image frame). The frame replay tap point 64C, located downstream of the compensation blocks 48A and 48B, may be selected. Thus, a partially processed image frame may be collected after processing through the initial processing block 60, the compensation block 48A, and the compensation block 48B at the frame replay tap point 64C. Afterward, the initial processing block 60, the compensation block 48A, and the compensation block 48B may be operated in a lower-power mode (e.g., power gated, turned off, unused to reduce dynamic power consumption, operate with a reduced frequency). The partially processed image frame may be retrieved and processed by the blocks of the display pipe 36 downstream of the selected tap until new content is received in a new image frame or the controller 42 detects that the compensation factor A or the compensation factor B has changed.

Figure 12:
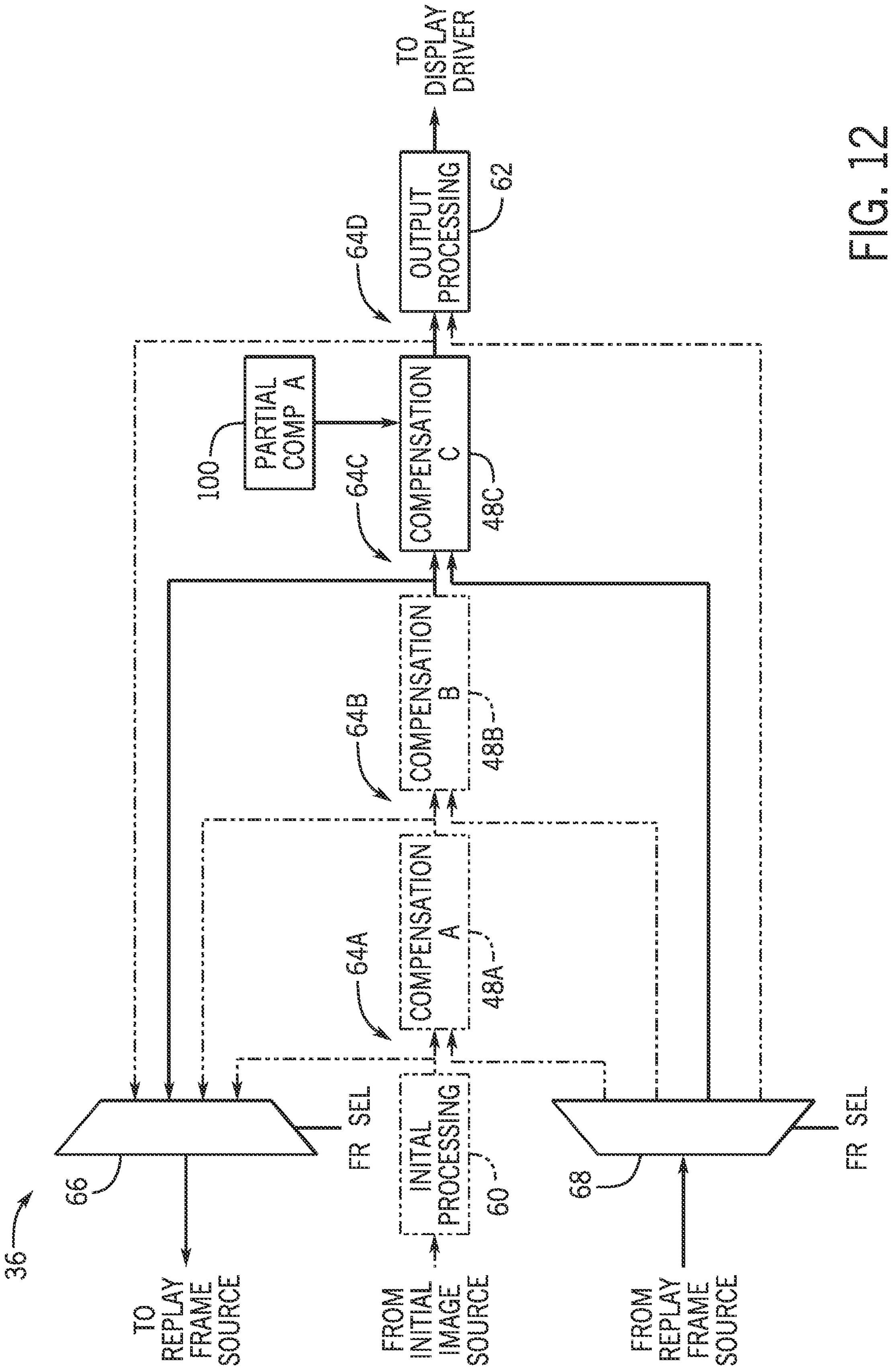
FIG. 12 is an example of a frame replay operation using a frame replay tap point located after the compensation block for a second compensation factor in which a partial compensation for the first compensation factor is applied, in accordance with an embodiment.

In some cases, even if a compensation factor that is compensated for using an upstream compensation block 48 that is operated in a lower-power mode (e.g., power gated, turned off, unused to reduce dynamic power consumption, operate with a reduced frequency) is expected to change or is changed, the display pipe 36 may enter or remain in a frame replay mode by applying a downstream partial compensation for that compensation factor. FIG. 12 shows an example where compensation blocks 48A and 48B, compensating for compensation factors A and B respectively, are power gated and the frame replay tap point 64C is in use. If the compensation factor A changes, rather than exit the frame replay mode, a full or partial compensation 100 may be applied into a downstream compensation block (here, compensation block 48C). The full or partial compensation 100 may provide the same or less compensation for the compensation factor A but may allow the compensation blocks 48A and 48B to remain power gated in a frame replay mode. This may be power efficient when the amount of power consumed by the input processing block 60 and compensation blocks 48A and 48B would be greater than that which would be consumed by the partial compensation 100. In one particular example, the compensation block 48A and the full or partial compensation block 100 may compensate at least partially for display brightness.

Figure 13:
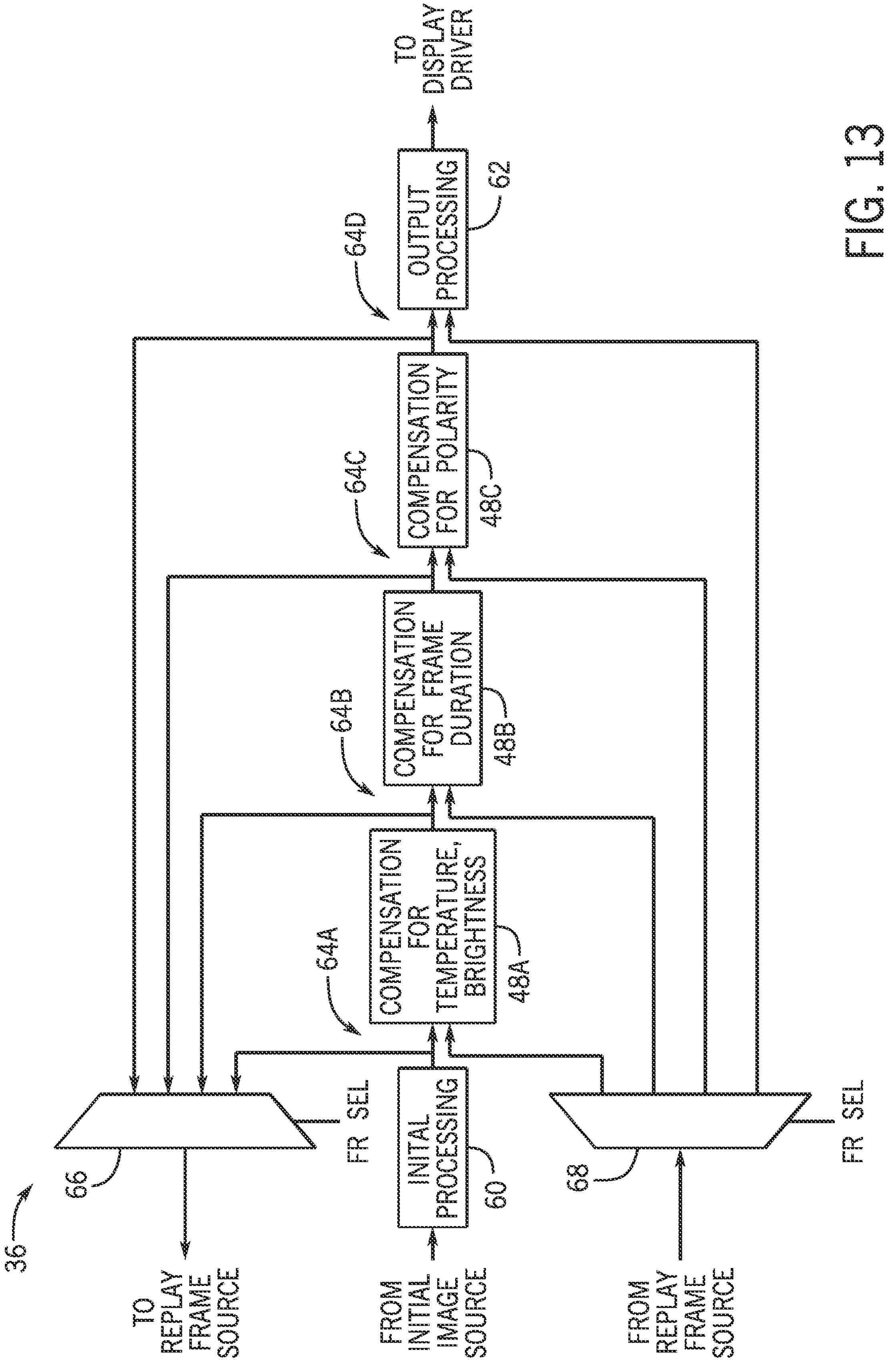
FIG. 13 is a block diagram of an example of the display pipeline of FIG. 7 having multiple selectable frame replay tap points based on temperature, brightness, frame duration, or polarity, in accordance with an embodiment.

As mentioned above, there may be any suitable number of compensation blocks 48 that may compensate for any suitable compensation factors or combinations of compensation factors. Moreover, the compensation blocks 48 may be arranged in any suitable order. FIG. 13 provides one example in which the compensation block(s) 48A compensate for temperature and brightness, the compensation block(s) 48B compensate for frame duration, and the compensation block(s) 48C compensate for the current electronic display programming polarity.

When an electronic display can operate at multiple different presentation rates (e.g., refresh rates), rapidly changing image content may look more appealing at higher presentation rates, while static content may be presented at lower presentation rates to achieve power savings. However, image artifacts could arise if the presentation rate is lowered too quickly. As such, the frame duration corresponding to presentation rate on the electronic display may be walked down gradually.

Figure 14:
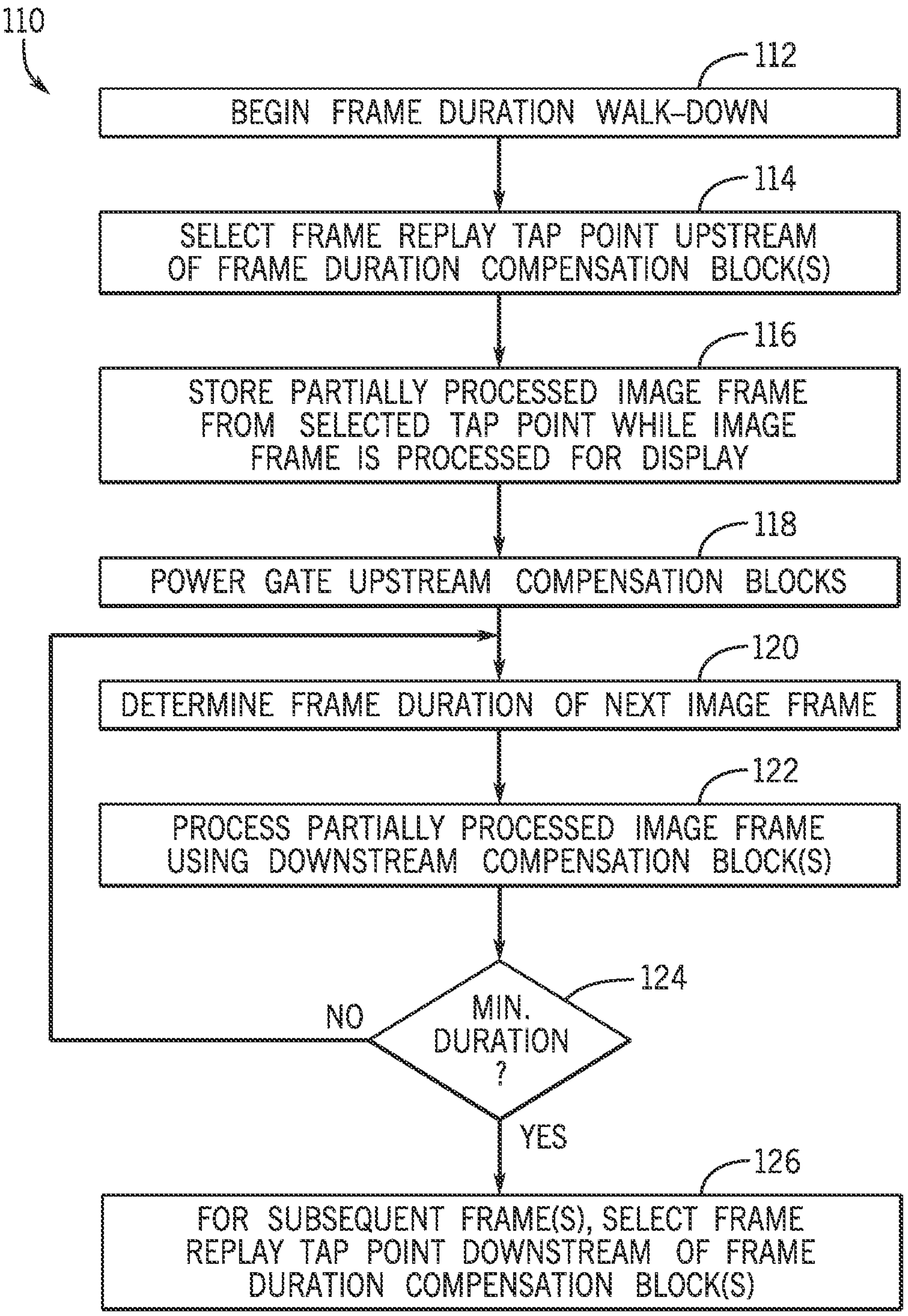
FIG. 14 is a flowchart of a method for performing a frame duration walk-down using frame replay, in accordance with an embodiment.

A frame duration walk-down may be a good candidate for frame replay. During a frame duration walk-down, the frame duration is gradually lowered according to a defined process. One example is described by a flowchart 110 of FIG. 14. The flowchart 110 starts when a frame duration walk-down begins (block 112). As such, the controller 42 may select a frame replay tap point 64 upstream of compensation block(s) 48 that compensate for frame duration or use the content of the image frame to define frame duration (e.g., a panel response correction block, a content-dependent frame duration block) (block 114).

After processing the image frame through the initial processing block 60 and/or compensation block(s) 48 upstream of the selected display replay tap point 64, the partially processed image frame may be stored into the replay frame source 50 in the memory 20 (block 116). The compensation block(s) 48 upstream of the selected display replay tap point 64 may be operated in a lower-power mode (e.g., power gated, turned off, unused to reduce dynamic power consumption, operate with a reduced frequency) (block 118). In this way, the compensation block(s) 48 upstream of the selected display replay tap point 64 may operate in a low-power mode (e.g., consuming less power, be turned off) and may no longer process the image frame.

The frame duration of the next image frame may be determined (block 120). In one example, a content-dependent frame duration (CDFD) block of the display pipe 36 may select a frame duration at least partially based on the content of the image frame. In another example, the frame duration of each subsequent image frame may be defined in advance through the frame duration walk-down. To replay the next image frame at the determined frame duration, the partially processed image frame may be retrieved from the replay frame store and processed by the blocks downstream of the selected display replay tap point 64 (block 122).

If the determined frame duration is not a minimum duration of the electronic display (decision block 124), the flow may return to block 120. If the determined frame duration is a minimum duration of the electronic display (decision block 124), a new replay tap point 64 may be selected that is downstream of the compensation block(s) 48 that compensate for frame duration or use the content of the image frame to define frame duration (block 126). Thereafter, the compensation block(s) 48 that compensate for frame duration or use the content of the image frame to define frame duration may be operated in a lower-power mode. Frame replay may continue using the new replay tap point 64 until an exit condition is reached.

Figure 15:
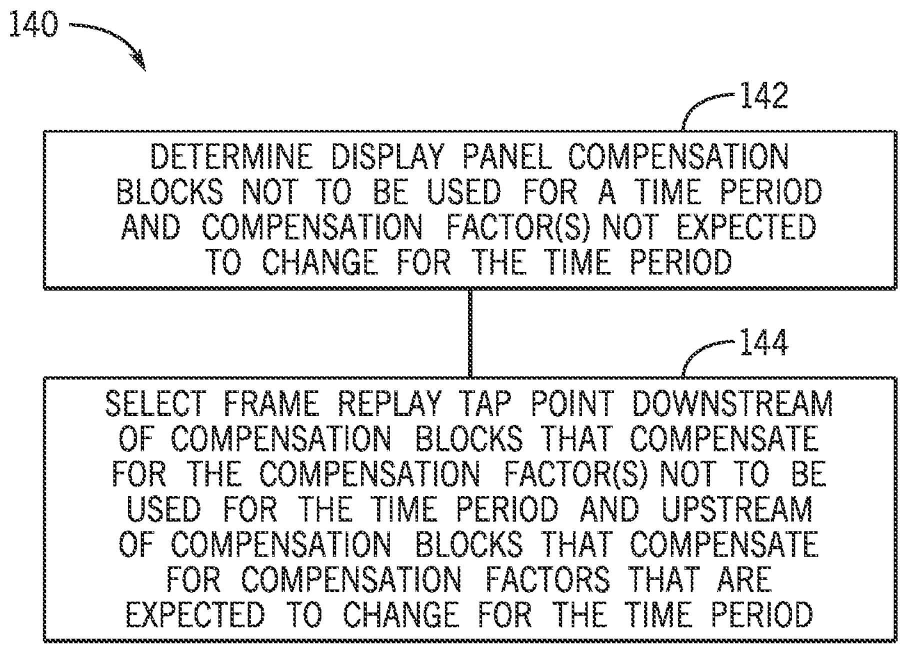
FIG. 15 is a flowchart of a method for selecting a tap point for a frame replay operation based on an unused compensation factor, in accordance with an embodiment.

FIG. 15 is a flowchart 140 of a method for performing frame replay when compensation block(s) are not to be used. At the start of the flowchart 140, the controller 42 may determine whether any compensation block(s) 48 are not to be used, as well as whether there are any compensation factors expected not to change for some period of time (block 142). By way of example, polarity-specific dithering may not be useful at sufficiently long frame durations (e.g., 1 Hz). In such a case, compensation block(s) 48 relating to polarity compensation may not be used. The controller 42 may select a frame replay tap point 64 downstream of corresponding compensation block(s) 48 (block 144). In the case of sufficiently long frame durations, in which polarity compensation may not be applied, the frame replay tap point 64 after the polarity compensation may be selected. This may be near or at the output of the display pipe 36, allowing most or substantially all blocks of the display pipe 36 to be operated in a lower-power mode.

Figure 16:
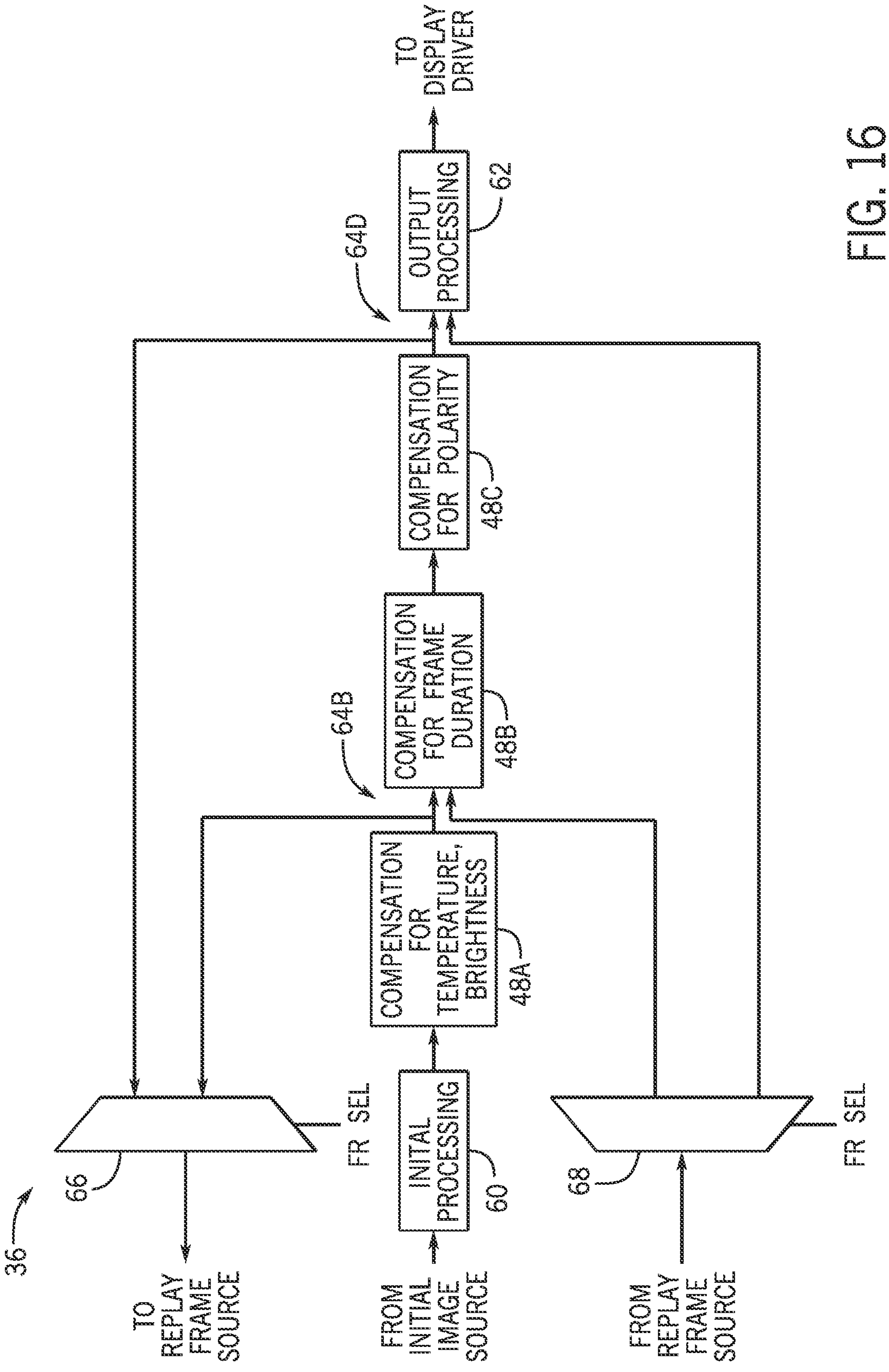
FIG. 16 is a block diagram of an example of the display pipeline of FIG. 7 having two selectable frame replay tap points based on whether a polarity is expected to change for signals used to drive an electronic display, in accordance with an embodiment.

FIG. 16 is a particular example of a display pipe 36 that includes two selectable tap points located before and after polarity-aware and frame-duration-related compensation block(s) 48B and 48C. The frame-duration-related compensation block(s) 48B may include any suitable processing blocks relating to frame duration (e.g., a content-dependent frame duration block). The polarity-aware compensation block(s) 48C may include a polarity-specific dither that applies distinct compensation based on the current polarity for programming signals of the electronic display.

Using these two frame replay tap points may allow for efficient partial frame replay for electronic displays with changing frame durations or polarities with relatively low cost in terms of wires. Indeed, different parts of the display pipe 36 may operate on image data of different bit depths. The bit depth of image data output to the display driver may be comparatively small (e.g., 6 to 16 bits depending on the bit depth of the electronic display). The bit depth of some intermediate processing blocks, however, may be quite large (e.g., 22-34 bits). Performing frame replay with image data with comparatively high bit depths may substantially increase the number of wires used to transmit the image data. Doing so may also involve taking up significantly more memory space than the arrangement shown in FIG. 16. Moreover, in the example of FIG. 16, both frame replay tap points 64 may obtain image data at the same bit depth (e.g., 10 bits, 11 bits, 12 bits, 13 bits, 14 bits, 15 bits, 16 bits).

Figure 17:
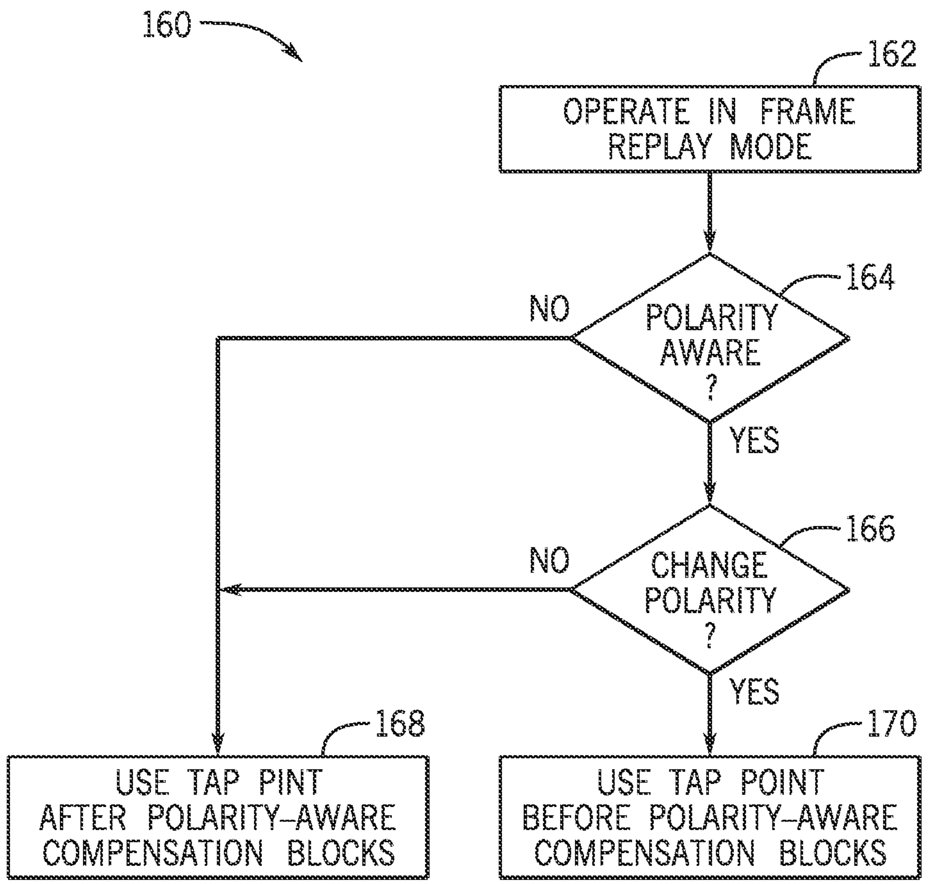
FIG. 17 is a flowchart of a method for selecting a tap point for a frame replay operation based on a polarity of signals used to drive an electronic display, in accordance with an embodiment.

By using the example of the display pipe 36 shown in FIG. 16 or others having multiple selectable frame replay tap points, frame replay may be used whether or not a polarity-aware compensation block 48 is in use. Indeed, as shown by a flowchart 160 of FIG. 17, the display pipe 36 may begin operating in a frame replay mode (e.g., when the controller 42 detects that new image data is not being provided or detects a threshold number of image frames with the same content) (block 162). If a polarity-aware compensation block 48 is not in use (decision block 164) or, if one is, if polarity is not expected to change for some threshold number of one or more image frames (decision block 166), frame replay may be carried out using a frame replay tap point 64 that is after the polarity-aware compensation block(s) 48 (block 168). If a polarity-aware compensation block 48 is in use (decision block 164) and polarity is expected to change for at least the next image frame (decision block 166), frame replay may be carried out using a frame replay tap point 64 that is before the polarity-aware compensation block(s) 48 (block 170).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Moreover, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. Image processing circuitry comprising:

first compensation circuitry configured to process an image frame to at least partially compensate for a first compensation factor relating to a first physical parameter of an electronic display;

second compensation circuitry configured to process the image frame to at least partially compensate for a second compensation factor relating to a second physical parameter of the electronic display after the image frame has been processed by the first compensation circuitry;

a first access point located between the first compensation circuitry and the second compensation circuitry, wherein the first access point enables the image frame to be stored and reused after being processed through the first compensation circuitry and before being processed through the second compensation circuitry; and a second access point located after the second compensation circuitry, wherein the second access point enables the image frame to be stored and reused after being processed through the second compensation circuitry.

2. The image processing circuitry of claim 1, wherein the first compensation circuitry is configured to be operated in a lower-power mode to reduce power consumption when the image frame is stored and reused after being processing through the first compensation circuitry.

3. The image processing circuitry of claim 1, comprising selection circuitry to select between the first access point and the second access point to selectively store and reuse the image frame after being processed through the first compensation circuitry or the second compensation circuitry.

4. The image processing circuitry of claim 3, comprising a controller configured to:

determine that the second physical parameter is expected to change to an extent that would impact image quality without compensation over a series of refresh periods of the electronic display;

determine that the first physical parameter is expected not to change to the extent that would impact image quality without compensation over the series of refresh periods of the electronic display; and select the first access point to store and reuse the image frame over the series of refresh periods.

5. The image processing circuitry of claim 3, comprising a controller configured to:

determine that the second physical parameter is expected not to change to an extent that would impact image quality without compensation over a series of refresh periods of the electronic display;

determine that the first physical parameter is expected not to change to the extent that would impact image quality without compensation over the series of refresh periods of the electronic display; and select the second access point to store and reuse the image frame over the series of refresh periods.

6. The image processing circuitry of claim 1, wherein the first compensation factor comprises a temperature, brightness, or frame duration and the second compensation factor comprises a programming Polarity of the electronic display.

7. An article of manufacture comprising one or more tangible, non-transitory, machine-readable media storing instructions that, when executed, cause image processing circuitry of an electronic device to:

begin a frame duration walk-down over which successive presentation times of an image frame on an electronic display will increase over a period of time;

select a frame replay access point upstream of frame duration compensation circuitry in a pipeline of compensation circuitry;

store a partially processed image frame obtained at the frame replay access point while processing the image frame for display on the electronic display;

operate at least some image processing circuitry upstream of the frame replay access point in a lower-power mode; and retrieve the partially processed image frame and process the partially processed image frame using image processing circuitry downstream of the frame replay access point in the pipeline of compensation circuitry.

8. The article of manufacture of claim 7, wherein the instructions, when executed, cause the image processing circuitry to determine a subsequent frame duration in parallel or prior to processing the partially processed image frame using image processing circuitry downstream of the frame replay access point in the pipeline of compensation circuitry.

9. The article of manufacture of claim 8, wherein the instructions, when executed, cause the image processing circuitry to:

when the subsequent frame duration is a minimum frame duration of the electronic display, select a second frame replay access point downstream of the frame duration compensation circuitry and store a second partially processed image frame obtained at the second frame replay access point while processing the partially processed image frame for display on the electronic display.

10. The article of manufacture of claim 9, wherein the instructions, when executed, cause the image processing circuitry to:

power gate the frame duration compensation circuitry; and retrieve the second partially processed image frame and process the second partially processed image frame using image processing circuitry downstream of the second frame replay access point in the pipeline of compensation circuitry.

11. The article of manufacture of claim 10, wherein processing the second partially processed image frame using image processing circuitry downstream of the second frame replay access point in the pipeline of compensation circuitry comprises processing the second partially processed image frame to compensate for a programming polarity of the electronic display.

12. The article of manufacture of claim 7, wherein processing the image frame for display on the electronic display comprises compensating the image frame for a change in temperature, brightness, frame duration, or programming polarity of the electronic display.

13. The article of manufacture of claim 12, wherein the instructions, when executed, case the image processing circuitry to retrieve the partially processed image frame and process the partially processed image frame using to compensate for all but one of the change in temperature, brightness, frame duration, or programming polarity of the electronic display.

14. Image processing circuitry disposed in a pipeline of circuits comprising:

a first compensation circuit in the pipeline that is configured to compensate for a first compensation factor relating to a physical parameter of an electronic display;

a first selectable frame replay access point located in the pipeline before the first compensation circuit; and a second selectable frame replay access point located in the pipeline after the first compensation circuit.

15. The image processing circuitry of claim 14, comprising a controller configured to determine whether the first compensation factor is expected to change in a subsequent frame and select the first selectable frame replay access point or the second selectable frame replay access point.

16. An electronic device comprising:

an electronic display configured to display an image frame that is compensated for at least a first compensation factor and a second compensation factor corresponding to the electronic display; and image processing circuitry configured to prepare the image frame for display over a series of refresh periods of the electronic display at least in part by:

for a first refresh period of the series of refresh periods:

performing a first compensation on the image frame based at least in part on the first compensation factor to obtain a partially processed image frame;

storing the partially processed image frame into memory for future reuse; and performing a second compensation on the partially processed image frame based at least in part on the second compensation factor; and for a second refresh period of the series of refresh periods:

retrieving the partially processed image frame from the memory; and performing the second compensation on the partially processed image frame based at least in part on the second compensation factor.

17. The electronic device of claim 16, wherein the image processing circuitry is configured to operate circuitry used to perform the first compensation after performing the first compensation in a lower-power mode.

18. The electronic display of claim 16, wherein the image processing circuitry is configured to determine that the first compensation factor is not expected to change over a period of time and that the second compensation factor is expected to change over the period of time.

19. The image processing circuitry of claim 1, wherein the first access point is a first tap point and the second access point is a second tap point.

20. The article of manufacture of claim 7, wherein the frame replay access point is a frame replay tap point.

21. The image processing circuitry of claim 14, wherein the first selectable frame replay access point is a first selectable frame replay tap point and the second selectable frames replay access point is a second selectable frame replay tap point.

* * * * *